US005414553A

United States Patent [19]

Nochebuena et al.

[11] Patent Number: 5,414,553

[45] Date of Patent: May 9, 1995

[54] ELECTROABSORPTIVE ASYMMETRICAL FABRY-PEROT MODULATOR ARRAY FOR LINE PRINTERS

[75] Inventors: Rogelio F. Nochebuena, Pasadena; Thomas L. Paoli, Los Altos, both of Calif.

[73] Assignee: Xerox Corporation, Stamford, Conn.

[21] Appl. No.: 158,559

[22] Filed: Nov. 29, 1993

[51] Int. Cl.[6] .......... G01D 15/14

[52] U.S. Cl. .......... 359/259; 347/255; 347/136

[58] Field of Search .......... 359/259; 346/160, 108; 358/482

[56] References Cited

U.S. PATENT DOCUMENTS

| | | | |
|---|---|---|---|
| 4,376,568 | 3/1983 | Sprague | 350/356 |
| 4,377,753 | 3/1983 | Mir | 250/578 |
| 4,413,270 | 11/1983 | Sprague | 346/160 |
| 4,801,194 | 1/1989 | Agostinelli et al. | 350/356 |
| 5,081,597 | 1/1992 | Kowalski | 364/525 |
| 5,157,538 | 10/1992 | Soref | 359/245 |
| 5,327,274 | 7/1994 | Yamaguchi | 359/259 X |

*Primary Examiner*—Mark Hellner
*Attorney, Agent, or Firm*—Fariba Rad

[57] ABSTRACT

There is disclosed a line printing system of this invention which utilizes an array of asymmetrical Fabry-Perot light valves for simultaneously transferring all pixel information of one raster line onto a photoreceptor. The number of elements of the light valve array used in this invention is equal to the number of pixels on a raster line. The pixel information is applied to elements of the light valve array in a parallel format with information representing each pixel applied to one elemental light valve of the array. The array is illuminated by a wedge-shaped incident light beam forming a focussed line image. Depending on the information state of each pixel, each corresponding element will be activated to absorb incident light or left in its neutral state to reflect the light. Light reflected by neutral elements will be directed onto the photoreceptor. In this fashion, the photoreceptor simultaneously receives the pixel information for the entire raster line. In another mode, the elements will be activated to reflect the light beam and will be left in their neutral state to absorb the light beam.

20 Claims, 5 Drawing Sheets

FIG. 4
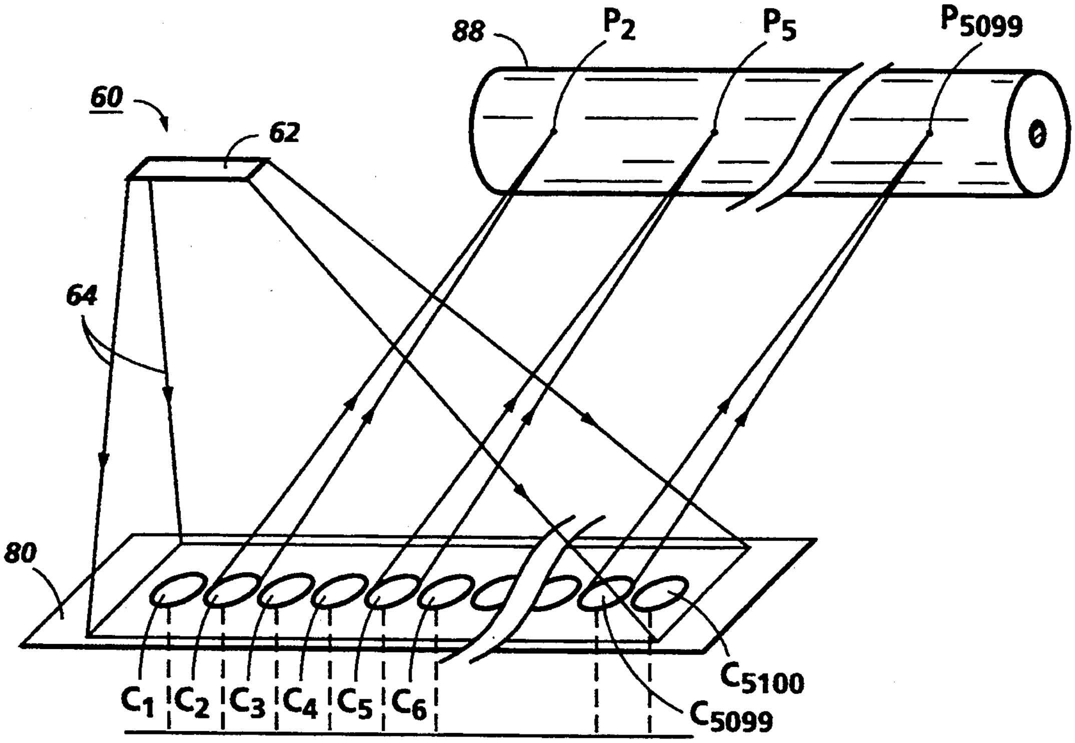
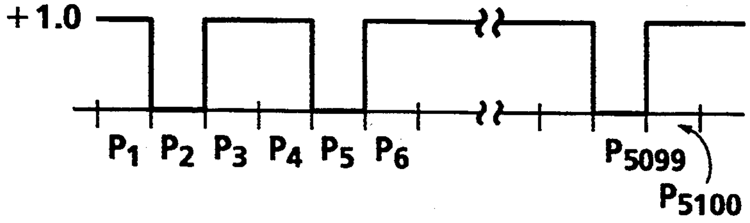
FIG. 5

ELECTROABSORPTIVE ASYMMETRICAL FABRY-PEROT MODULATOR ARRAY FOR LINE PRINTERS

BACKGROUND OF THE INVENTION

This invention relates to a printing system, and more particularly, to a line printing system which is capable of simultaneously transferring all pixel information of one raster line or one text line through use of an array of light valves.

It has been shown that an electro-optic element having a plurality of individually addressable electrodes can be used as a multi-gate light valve for line printing. See, for example, U.S. Pat. No. 4,281,904 on a "TIR Electro-Optic Modulator with Individually Addressed Electrodes" and U.S. Pat. No. 4,389,659 on an "Electro-Optic Line Printer". Also, see "Light Gates Give Data Recorder improved Hard Copy Resolution," Electronic Design, Jul. 19, 1979, pp. 31–32; "Polarizing Filters Plot Analog Waveforms," Machine design, Vol. 51, No. 17, Jul. 26, 1779, p. 62; and "Data Recorder Eliminates Problem of Linearity," Design News, Feb. 4, 1980, pp. 56–57.

Almost any optically transparent electro-optic material can be used as the electro-optic element of a light valve such as $LiNbO_3$, BSN, KDP, $KD_xP$, $Ba_2NaNb_5O_{15}$ and PLZT. The electrodes of such a light valve are coupled to the electro-optic element and are distributed in non-overlapping relationship widthwise of the electro-optic element (i.e. orthogonally relative to its optical axis), typically on equidistantly separated centers so that there is a generally uniform inter-electrode gap spacing.

To perform line printing with a multi-gate light valve of the foregoing type, a photosensitive recording medium, such as a xerographic photoreceptor, is exposed in an image configuration as it advances in a cross line direction relative to the light valve. More particularly, to carry out the exposure process, a sheet -like collimated light beam is transmitted through the electro-optic element of the light valve, either along its optical axis for straight through transmission or at a slight angle relative to that axis for total internal reflection. Furthermore, successive sets of pixel information are sequentially applied to the electrodes.

In the case of straight through transmission, a light valve is positioned between two polarizing filters, the axis of one filter oriented at 90 degrees with respect to the other to totally block the passage of light. An unpolarized collimated light beam will be polarized linearly by the first filter, along the horizontal axis. When the gates are not activated, the polarized light is blocked by the second filter. However, the activated light gate rotates the plane of polarization of light 90 degrees so that it passes through the second filter. Light, which is passed through, is then focused by a lens as a spot on a photoreceptor.

In the case of total internal reflection, an electro-optic element (a crystal with multi-surface) is arranged such that a collimated beam of light of single wavelength incident at an angle to the plane of one surface is refracted at the other surfaces to incur total internal reflection at the entrance surface. By applying a voltage to the electro-optic element which induces an electric field adjacent to the light entrance surface, the refractive index of the electro-optic material will change, thereby frustrating the total internal reflection. The reflected light at a certain angle will then be focused on a photoreceptor.

The above printing systems are not efficient users of light source. Furthermore, the multi-gate light valve in each case requires a significant voltage, typically between 10 and 20 volts, to switch each pixel and therefore is not directly compatible with low-voltage silicon circuits. In addition, assembly of such multi-gate light valves is cumbersome and unreproducible, thereby having a low yield and high price. Finally light valves of this type utilize electro-optic materials which are not monolithically compatible with semiconductors so that integration of driver electronics with the modulator is not possible.

SUMMARY OF THE INVENTION

The object of this invention is to make a line printing system by utilizing a high density array of light valves in order to simultaneously transfer the pixel information of one raster line onto a photoreceptor plane by reflecting or absorbing the light beam for different pixels.

The printing system of this invention utilizes an array of asymmetrical Fabry-Perot light valves for transferring pixel information onto the photoreceptor. The number of elements of the light valve array used in this invention is equal to the number of pixels on a raster line. The pixel information is applied to elements of the light valve array in a parallel format with information representing each pixel applied to one elemental light valve of the array. The array is illuminated by a wedge-shaped incident light beam forming a focussed line image. Depending on the information state of each pixel, each corresponding element will be activated to absorb incident light or left in its neutral state to reflect the light. Light reflected by neutral elements will be directed onto the photoreceptor. In this fashion, the photoreceptor simultaneously receives the pixel information for the entire raster line.

Another object of this invention is to simultaneously transfer the pixel information of one text line onto the photoreceptor. The printing system of this invention can utilize a two dimensional array of asymmetrical Fabry-Perot light valves for simultaneously transferring the pixel information of one line of text onto the photoreceptor. The pixel information is applied to elements of the light valve array in a parallel format with information representing each pixel applied to one elemental light valve of the array. The array is illuminated by a wedge-shaped incident light beam forming a focussed line image. Depending on the information state of each pixel, each corresponding element will be activated to absorb the incident light or left in the neutral state to reflect the light. Light reflected by neutral elements will be directed onto the photoreceptor. In this fashion, the photoreceptor simultaneously receives the pixel information for the entire line of text.

BRIEF DESCRIPTION OF THE DRAWINGS

FIG. 4 shows a magnified view of the light valve array used in the printing system of this invention for simultaneously reflecting all pixel information of one scan line;

FIG. 5 shows a train of pixel information that is used to activate the cells in FIG. 4;

DESCRIPTION OF THE PREFERRED EMBODIMENT

The present invention utilizes an array of asymmetrical Fabry-Perot light valves to replace the rotating polygon of a conventional raster output system.

A Fabry-Perot light valve is a quantum well structure which comprises a plurality of layers of different semiconductor materials with different thicknesses. Fabry-Perot light valves are used for many different applications such as modulating light waves in optical telecommunication systems, photonic switching, optical computing, etc. The thickness, the property and finally the kind of material of each layer depend on the application. It should be noted that even in the same application the selection of material and the thickness of the materials depend on the required result. For example to reflect or to absorb light beams with different wavelengths, different Fabry-Perot light valves with different design criteria are required. The Fabry-Perot light valve utilized in this invention is designed to reflect or absorb a visible laser light beam with nominally 670 nm wavelength.

Figure 1:
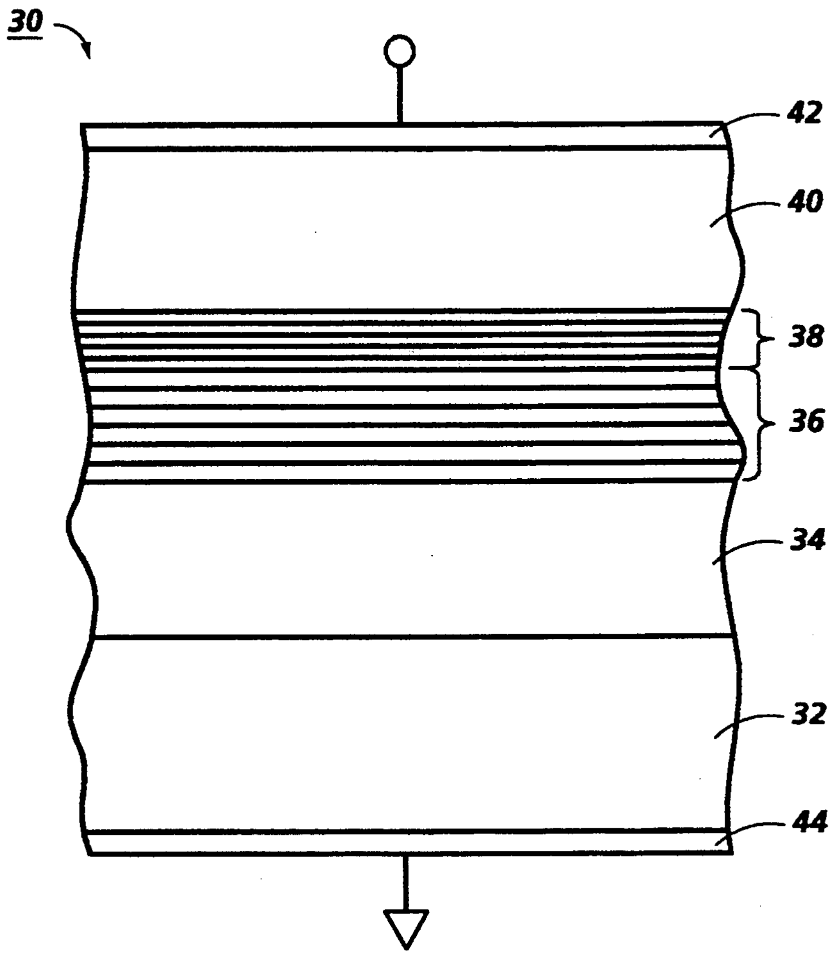
FIG. 1 shows a cross section of a quantum well structure used for the Fabry-Perot light valve of this invention.

Referring to FIG. 1, there is shown a cross section of a quantum well structure used for the Fabry-Perot light valve 30 of this invention. The quantum well structure is fabricated on a substrate 32 of n-doped GaAs, where the n-doping level is about $1\times10^{18}/cm^3$. Above the substrate 32 a layer 34 of n-doped GaAs with a thickness of 0.1 μm is grown as a buffer layer. Then a multiple layer reflector 36 is grown over the buffer layer 34. Reflector layer 36 comprises 25 periods of 522 A° layers of $In_{0.5}Al_{0.5}P$ alternating with 484 A° layers of $In_{0.5}(Al_{0.2}Ga_{0.8})_{0.5}P$. An undoped multiple quantum well active layer 38 is grown above the reflector layer 36. The multiple quantum well layer 38 which is 0.36 to 0.45 m thick consists of 20 to 25 periods of undoped 120 A° layers of $Ga_{0.5}In_{0.5}P$ alternating with undoped 60 A° layers of $In_{0.5}(Al_{0.5}Ga_{0.5})_{0.5}P$. Above the multiple quantum well layer 38, there is grown a spacer/contact layer 40 of p-doped $In_{0.5}(Al_{0.2}Ga_{0.8})_{0.5}P$ with a thickness of about 0.5 μm and doping of $5\times10^{17}/cm^3$ or greater. Finally, a top contact 42 of the structure is a 200 A° thin film of Au. Also, at the bottom of the substrate, there is a layer 44 of AuSn with 2000 A° thickness which is used to provide electrical contact to the substrate.

The quantum well structure 30 shown in FIG. 1 when connected to a suitable voltage is capable of reflecting or absorbing a light beam depending on the applied voltage. A portion of the incident light beam is reflected from layer 42 while a second portion of the incident beam is coupled into the Fabry-Perot structure formed by layer 42 and reflector 36. The latter portion undergoes multiple passes through layer 40 and multiple quantum well layer 38 as it is repeatedly reflected by reflector 36 and layer 42. At the surface of layer 42, the amplitudes of these multiple reflections add coherently to the amplitude of the incident light directly reflected by layer 42. The optical length from layer 42 to reflector 36 and back is chosen such that the multiple reflected amplitudes are out of phase with the direct reflection from layer 42 and thus interfere destructively.

However, the Fabry-Perot cavity formed between the top contact layer 42 and reflector 36 is asymmetric, i.e. the amplitude reflected by layer 36 is greater than the amplitude reflected by layer 42. Thus in the neutral state, where multiple quantum well layer 38 is substantially transparent to the light beam, the amplitude of the light reflected by layer 36 is greater than the amplitude of the light reflected by layer 42, thereby producing a net reflection from light valve 30. On the other hand, application of a voltage to light valve 30 produces optical absorption of the light in layer 38, thereby reducing the amplitude of the light at layer 42 from reflection off layer 36. For the level of voltage which produces enough absorption to make the amplitude of light reflected from reflector 36 equal to the amplitude of the light reflected from layer 42, complete cancellation occurs and the net reflection from light valve 30 is zero.

With the structure shown in FIG. 1, a voltage in the range of 3 to 10 volts causes the light valve to absorb the incident light beam and a voltage in the neighborhood of 0 volts causes the light valve 30 to stay in the neutral state where it reflects the incident light beam. However, it should be noted that the structure of the quantum well can be designed to reflect the light beam when a voltage in the range of 3– to 10 volts is applied and to absorb the light beam when a voltage in the neighborhood of 0 volts is applied.

The quantum well structure shown in FIG. 1 can be fabricated in a cylindrical shape and the cylindrical structure can be repeated on one substrate. Alternatively, each cylinder can be defined by proton bombardment, impurity induced layer disordering, or etch and regrowth techniques, which are well known to those skilled in the art. Therefore, each substrate can contain a plurality of cylindrical light valves. The individual light valves can be designed to be in an array format meaning that they can be designed to be aligned on one straight line. Also, the number of light valves can be designed to be equal to the number of pixels on one scan line. Hereinafter, for the purpose of this invention, each cylindrical light valve, which also was referred to as an element of a light valve array, will be called a "cell".

Figure 2:
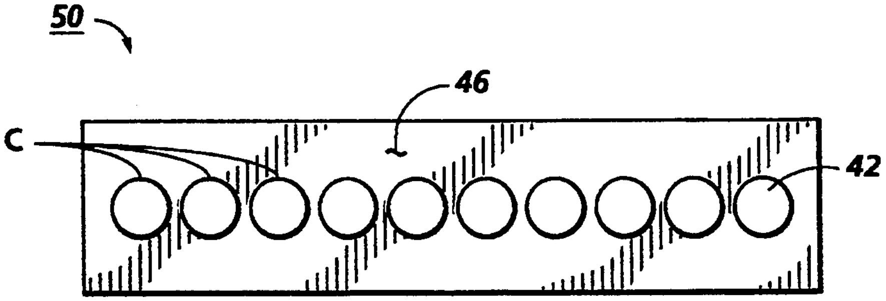
FIG. 2 shows a top view of a modulator of this invention with a plurality of cells.

Referring to FIG. 2, there is shown a top view of a modulator 50 with a plurality of cells C. As can be observed the modulator comprises a single array of cells C each of which corresponds to one pixel on a photoreceptor. Each one of these cells is independent of the other cells and each one is addressed individually. The cross section of each cell is illustrated as a circle in FIG. 2 but could equally well be elliptical, rectangular, or any other shaped desired of each pixel. It should be noted that for write-white imaging systems, the top layer 46 surrounding the cells C should be made of a reflective material, but for write-black imaging systems, the top layer 46 surrounding the cells C should be made of a non reflective material.

Figure 3:
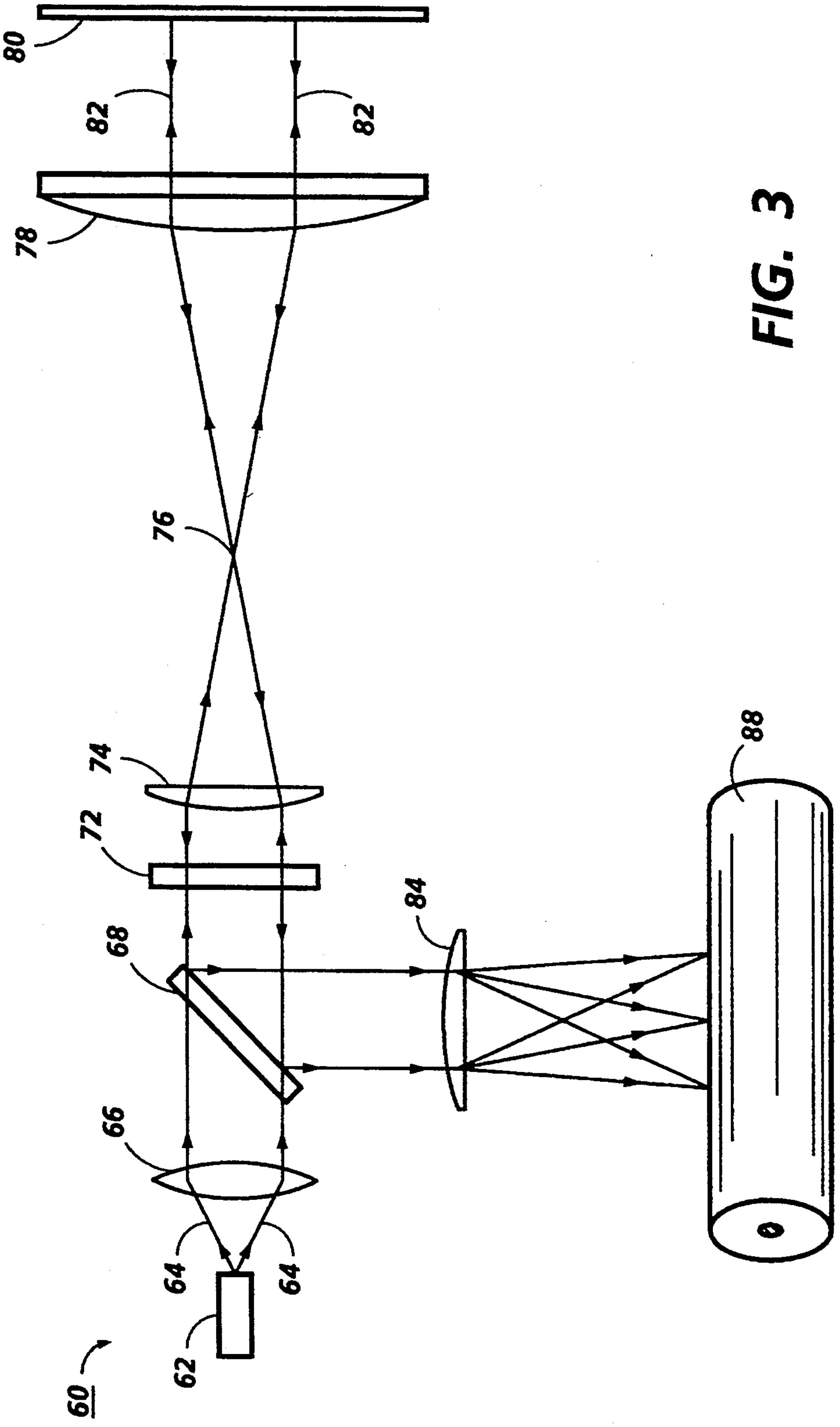
FIG. 3 shows a fast scan or tangential view of a printing system of this invention.

Reference is now made to FIG. 3 wherein there is disclosed a fast scan or tangential view of a printing system 60 of this invention. A laser diode light source 62 emits a coherent light beam 64 which is collimated in the sagittal and tangential directions by a spherical lens system 66. The collimated light beam from lens 66 is passed through a polarizing beamsplitter 68 and a λ/4 retardation plate 72. The polarizing beamsplitter 68 polarizes the incident beam or passes the incident beam if the laser emitted a polarized light beam. Retardation plate 72 rotates the plane of linear polarization by 45 degrees. Cylindrical lens 74 focuses the collimated beam to a virtual point 76 which is refocused and then collimated by the cylindrical front surface of toric lens 78 onto light valve array 80. In the sagittal direction, the collimated beam is not changed by cylindrical lens 74 but is focussed by the cylindrical back surface of toric lens 78 to a wedge-shaped beam forming a focussed line image on light valve array 80.

Light beam 82 is reflected by non-activated cells of light valve array 80 and absorbed by activated cells of light valve array 80 to form a pixelatted line image. Light reflected from the array is imaged back through lenses 78 and 74 to retardation plate 72. Retardation plate 72 rotates the plane of polarization by another 45 degrees, thereby making its polarization orthogonal to the polarization transmitted by the polarizing beamsplitter. Consequently polarizing beamsplitter 68 reflects the backward traveling beam to lens system 84 which images the pixelatted line image onto photoreceptor 88 to form a latent image.

It should be noted that slight variations of the illumination from cell to cell can be eliminated by controlling the absorption of the multiple quantum well layer 38 with a nonzero voltage in the off state. The required voltages are stored in memory for each system during initial setup.

The light beam 64 from the laser light source 62 has a Gaussian-like intensity distribution. However, in order to illuminate all the cells C of the light valve array 80 with a uniform intensity, the intensity of the light beam 64 has to be modified to have a uniform distribution over the entire width of the array. The two lenses 74 and 78 modify the Gaussian distribution of the light beam 64 to a uniform intensity distribution. It should be noted that any optical system which can modify the intensity of the light beam 64 to a uniform intensity can be utilized to replace the two lenses 74 and 78. In the present embodiment, lens 74 is a cylindrical lens with power in the tangential plane while lens 78 is a toric lens comprised of a front surface having power only in the tangential plane and a back surface having power only in the sagittal plane.

Referring to FIG. 4, there is shown a magnified view of the light valve array used in the printing system 60 of this invention. For simplicity only the light source 62, the light valve array 80 and the photoreceptor 88 are shown. The light valve array 80 utilized in this invention has 5100 cells, for 600 spi, each of which corresponds to a pixel on an 8.5 inch scan line. Typically, the light valve array will be about 3 cm long to cover an 8.5 inch scan line. Therefore, the overall magnification of the optical system is 7.2. In a 600 spi printing system, the light valve array should have a center-to-center spacing equal to 5.9 l m. However, it should be noted that depending on the pixels of each printing system, the number of pixels in the light valve array can be designed to match the pixel density required of that printing system. For example, if the printing system has 300 pixels/inch, the light valve array will have 2550 cells in the tangential direction. Each cell of the light valve array 80 is individually addressable and depending on the train of pixel information, the cells are selectively addressed and activated to absorb the light.

Referring to FIG. 5, there is shown a train of pixel information that is used to activate the cells in FIG. 4. Referring to both FIGS. 4 and 5, as it is observed that pixel P1, P3, P4, P6, P7 and P5099 are 1 and therefore cells C1, C3, C4, C6, C7 and P5099 are activated to absorb the light beam. As a result, the photoreceptor 88 receives no light spots at pixel P1, P3, P4, P6, P7, and P5099. However, since the train of pixel information contains a 0 for pixels P2, P5 and P5100, the cells C2, C5 and C5100 do not receive voltage and therefore reflect the light. As a result, the photoreceptor 88 receives light spots for the pixels P2, P5 and P5100.

Figure 6:
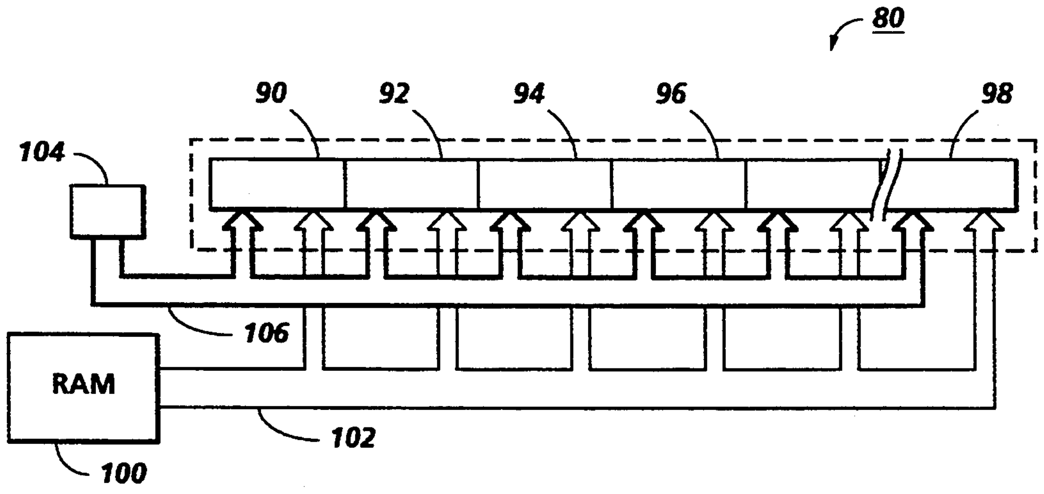
FIG. 6 shows a method of applying the pixel information to the light valve array.

Reference is now made to FIG. 6 which shows a method of applying the pixel information to the light valve array 80 to activate the cells that are needed to absorb the light beam. Each one of the boxes 90, 92, 94, 96 and 98 represents a group of 16 cells of the light valve array 80. The train of pixel information is stored in a random access memory (RAM) 100 which will be transferred to the cells via a 16-bit bus 102. At each clock cycle, a controlling processor 104 selects one group of the cells 90, 92, 94, 96 and 98 through an address bus 106. The number of the bits on the address bus varies with the number of the cells used in each system.

At each data transfer, 16-bits of data will be delivered to one group of 16 cells. Each cell will receive one bit of data and if the data is a 1, the cell will be activated to absorb and if the data is a 0 the cell will be left in its neutral state which then reflects the light beam. On the next clock cycle, the following 16-bits of data will be delivered to the second group of 16 cells. After each cell receives a bit of data, the cell will retain that data until it receives a reset or new data. When the last cells in the array have received their data, the controlling processor will send out a flag indicating that the array is ready to transfer the information for that scan line.

At this time the laser diode will be activated to illuminate the light valve array 80. The light beam illuminates the array only as long as needed to print the line, thereby avoiding pixel smear in the sagittal direction as well as reducing heat generated in the laser and the light valve array and extending the life of the laser source. Then the light valve array reflects light onto the photoreceptor plane from those cells that are not activated. The pixel information transfer rate for one scan line with the fastest commercial conventional printing systems is about 113 microsecond. However, the pixel information transfer rate for one scan line of this invention is 25 microsecond. This system is capable of transferring the data onto the photoreceptor at a printing speed of 1000 pages per minute which is an enormous improvement over the existing printing systems.

Figure 7:
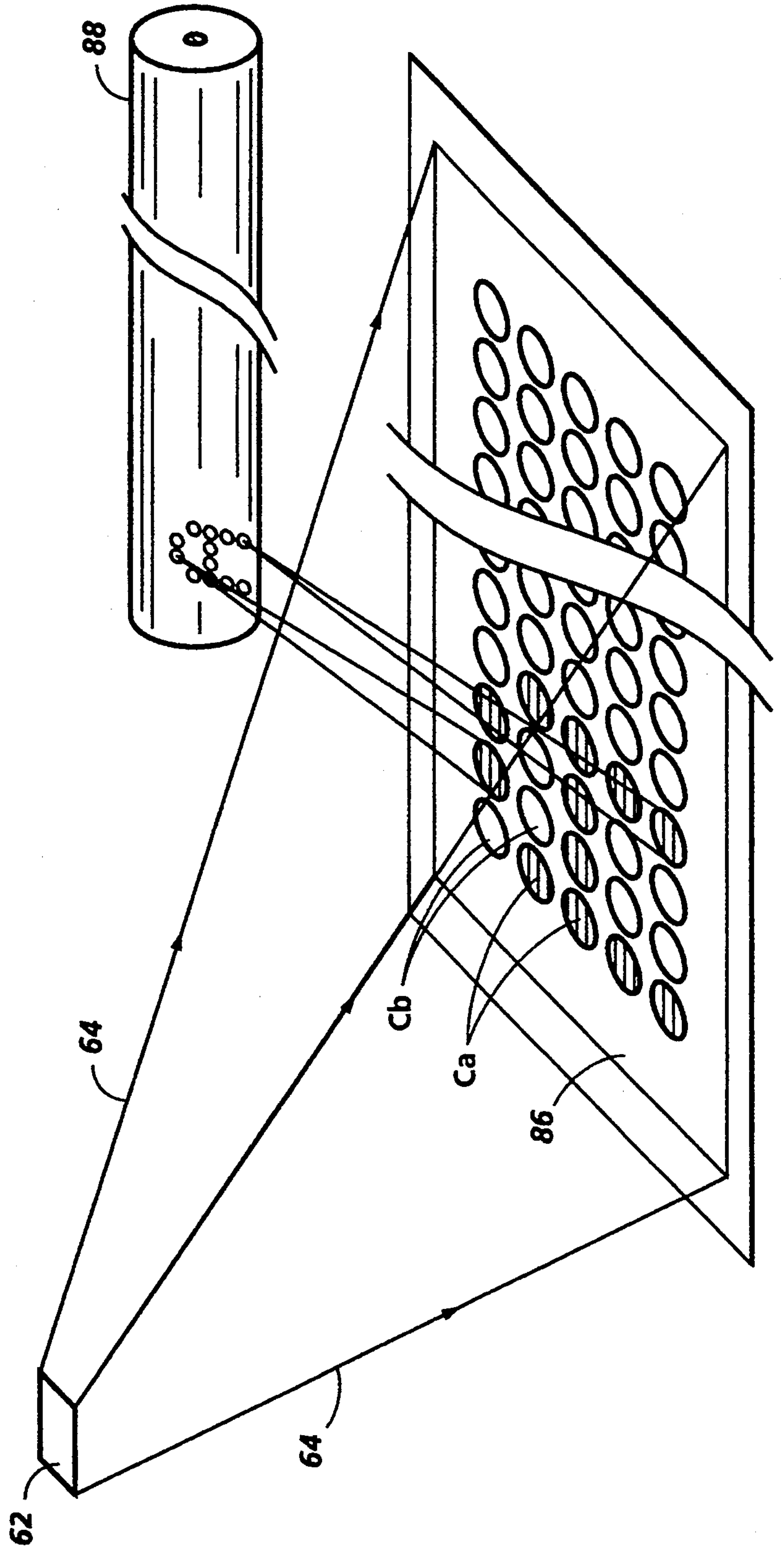
FIG. 7 shows a magnified view of the light valve array used in the printing system of this invention for simultaneously reflecting all pixel information of one text line.

Referring to FIG. 7, the same concept can be applied to design a modulator with multiple arrays of cells to provide simultaneous reflection of all pixel information in one text line. This means that depending on each printing system, there should be a plurality of rows of cells equal to the number of scan lines which can produce one text line. For example, in FIG. 7, the modulator 86 has enough rows, e.g. 5, to cover all the sagittal pixels of the letter A. It should be noted that in a real printing system the number of scan lines which are needed to produce a text line is much more than 5. However in FIG. 7, for simplicity, it is assumed that 5 scan lines will be enough to cover a text line. In FIG. 7, cells Cb are all activated to simultaneously absorb all the necessary pixels and cells Ca are left in their neutral state to simultaneously reflect all the necessary pixels to print the letter A.

It should also be noted that if one overcomes the complications of receiving the pixel information of a whole page on the photoreceptor, this concept can be expanded to design of a 2-dimensional light valve array which has enough rows and columns of cells to simultaneously reflect the pixel information of an entire page or image onto the photoreceptor.

In this invention by utilizing a light valve array, the need for scanning a light beam in a printing system is eliminated and therefore polygon mirrors which are used to scan a line on the photoreceptor will no longer be needed. The embodiment of this design not only eliminates the polygon in a raster scanning system, it also eliminates all the problems created by a polygon such as wobble, speed change, roll off and many more.

The printing system of this invention is more efficient in the use of light since the light source is turned on only when the pixel information is delivered to the light valve array and the light valves are ready to reflect or absorb the light. The light valve array used in this invention can also be used to control the amount of light being reflected by the light valves. Also, the shape of the pixels on the photoreceptor plane can be controlled by the shape of the valves which can be designed to have a desired shape such as a circle or a square. Furthermore, utilizing a Fabry-Perot light valve array provides the possibility of fabricating a small, high density chip using well-known techniques of semiconductor manufacture. The use of wafer-scale manufacturing decreases the fabrication cost and simplifies the fabrication of a page wide light valve array. In addition, due to the efficiency in the use of light, the power requirement on the light source will be lowered. Finally, the printing system of this invention can be used to write white or write black.

What is claimed is:

1. An optical system, comprising;

a light source for emitting a light beam;

a medium;

a modulator located in the path of the light beam from said light source;

said modulator having a plurality of elements each of which either absorbs the light beam or reflects the light beam;

said elements of said modulator being so constructed and arranged to reflect the light beam onto said medium;

means for exposing all of said elements to the light beam;

means for supplying a plurality of pixel information;

each of said elements being operably connected to said supplying means to receive one of said plurality of pixel information from said supplying means; and each of said plurality of elements of said modulator being responsive to said received pixel information for either absorbing or reflecting the light beam.

2. The system as recited in claim 1, wherein each of said plurality of elements has a neutral state to reflect the light beam onto said medium and an active state to absorb the light beam, the pixel information having a first state and a second state, each of said plurality of elements being responsive to the first state of pixel information to be activated from its neutral state to absorb the light beam and being responsive to the second state of pixel information for staying in a neutral state to reflect the light beam onto said medium.

3. The system as recited in claim 1, wherein each of said plurality of elements has a neutral state to absorb the light beam and an active state to reflect the light beam onto said medium, the pixel information having a first state and a second state, each of said plurality of elements being responsive to the first state of pixel information to be activated from its neutral state to reflect the light beam onto said medium and being responsive to the second state of pixel information for staying in a neutral state to absorb the light beam.

4. The system as recited in claim 1, wherein said plurality of elements of said modulator is equal to the number of pixels of a raster line for simultaneously transferring the pixel information of one raster line onto said medium.

5. The system as recited in claim 1, wherein said plurality of elements of said modulator is equal to the number of pixels of a text line for simultaneously transferring the pixel information of one line of text onto said medium.

6. The system as recited in claim 1, wherein said plurality of elements of said modulator is equal to the number of pixels of a full image for simultaneously transferring the pixel information of said image onto said medium.

7. The system as recited in claim 1, wherein said plurality of elements of said modulator is equal to the number of pixels of a full page document for simultaneously transferring the pixel information of said full page document onto said medium.

8. The system as recited in claim 1, wherein said modulator further comprises a reflective top layer surrounding each of said plurality of elements.

9. The system as recited in claim 1, wherein said modulator further comprises a non reflective top layer surrounding each of said plurality of elements.

10. The system as recited in claim 1, wherein said medium is a photoreceptor and a latent image is formed by the light beam reflected thereonto by said modulator.

11. The system as recited in claim 10, wherein each of said plurality of elements has a neutral state to reflect the light beam onto said medium and an active state to absorb the light beam, the pixel information having a first state and a second state, each of said plurality of elements being responsive to the first state of pixel information to be activated from its neutral state to absorb the light beam and being responsive to the second state of pixel information for staying in a neutral state to reflect the light beam onto said medium.

12. The system as recited in claim 10, wherein each of said plurality of elements has a neutral state to absorb the light beam and an active state to reflect the light beam onto said medium, the pixel information having a first state and a second state, each of said plurality of elements being responsive to the first state of pixel information to be activated from its neutral state to reflect the light beam onto said medium and being responsive to the second state of pixel information for staying in a neutral state to absorb the light beam.

13. The system as recited in claim 10, wherein said plurality of elements of said modulator is equal to the number of pixels of a raster line for simultaneously transferring the pixel information of one raster line onto said medium.

14. The system as recited in claim 10, wherein said modulator further comprises a reflective top layer surrounding each of said plurality of elements.

15. The system as recited in claim 10, wherein said modulator further comprises a non reflective top layer surrounding each of said plurality of elements.

16. The system as recited in claim 1, wherein all of said elements of said modulator are exposed to the light beam simultaneously.

17. The system as recited in claim 16, wherein each of said plurality of elements has a neutral state to reflect the light beam onto said medium and an active state to absorb the light beam, the pixel information having a first state and a second state, each of said plurality of elements being responsive to the first state of pixel information to be activated from its neutral state to absorb the light beam and being responsive to the second state of pixel information for staying in a neutral state to reflect the light beam onto said medium.

18. The system as recited in claim 16, wherein each of said plurality of elements has a neutral state to absorb the light beam and an active state to reflect the light beam onto said medium, the pixel information having a first state and a second state, each of said plurality of elements being responsive to the first state of pixel information to be activated from its neutral state to reflect the light beam onto said medium and being responsive to the second state of pixel information for staying in a neutral state to absorb the light beam.

19. The system as recited in claim 16, wherein said plurality of elements of said modulator is equal to the number of pixels of a raster line for simultaneously transferring the pixel information of one raster line onto said medium.

20. The system as recited in claim 10, wherein all of said elements of said modulator are exposed to the light beam simultaneously.

* * * * *